W. L. OSBORNE.
QUICK OPENING VALVE.
APPLICATION FILED NOV. 4, 1909.
971,552.
Patented Oct. 4, 1910.
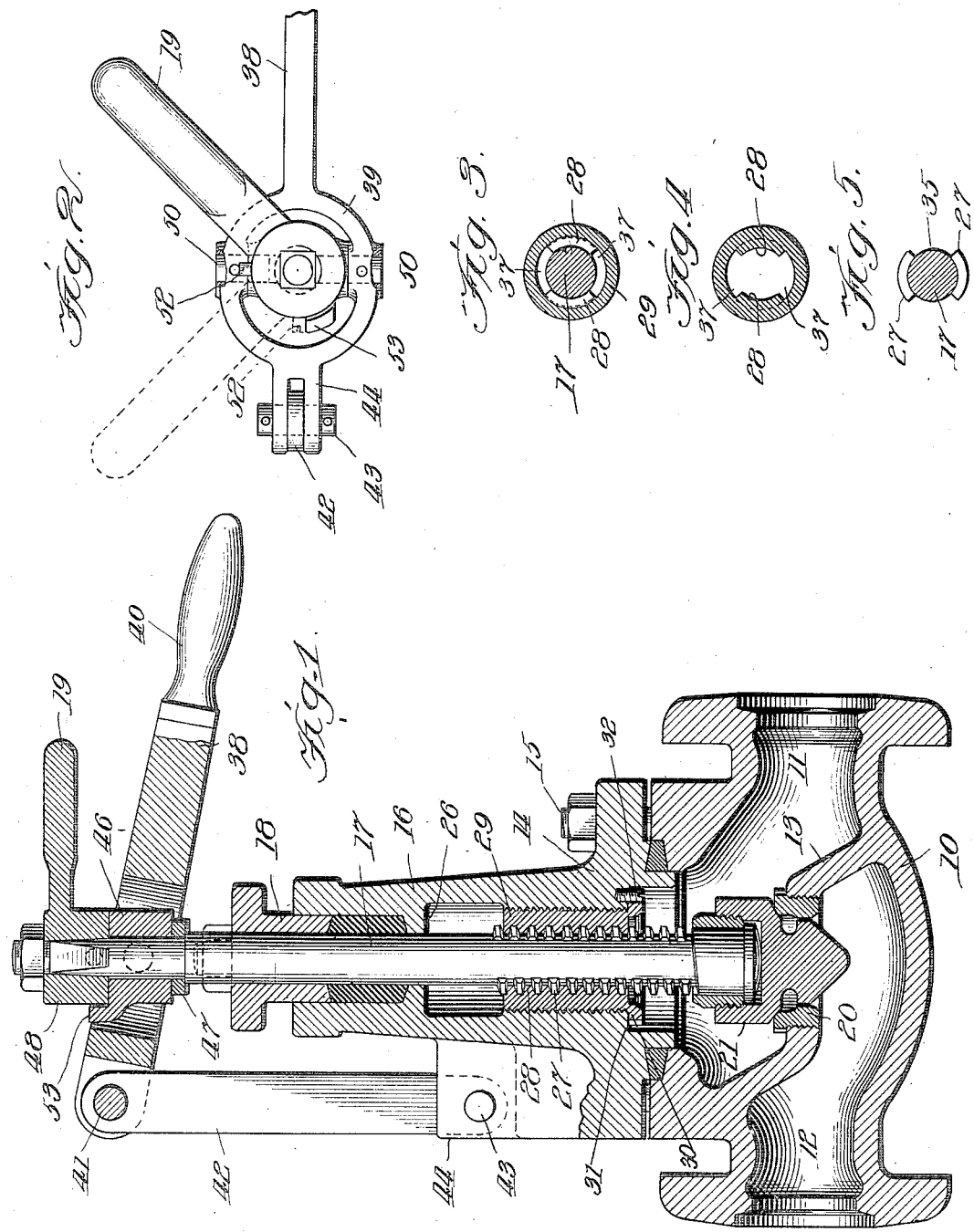
Witnesses:
Harry S. Gaither
W. Goldberger
Inventor:
William L. Osborne
by William H. Hall
atty

UNITED STATES PATENT OFFICE.

WILLIAM L. OSBORNE, OF CHICAGO, ILLINOIS.

QUICK-OPENING VALVE.

971,552.  Specification of Letters Patent.  Patented Oct. 4, 1910.

Application filed November 4, 1909. Serial No. 526,210.

*To all whom it may concern:*

Be it known that I, WILLIAM L. OSBORNE, a citizen of the United States, and a resident of Chicago, in the county of Cook and State of Illinois, have invented certain new and useful Improvements in Quick - Opening Valves; and I do hereby declare that the following is a full, clear, and exact description thereof, reference being had to the accompanying drawings, and to the characters of reference marked thereon, which form a part of this specification.

This invention relates to improvements in quick opening valves, and the invention consists in the matters hereinafter set forth and more particularly pointed out in the appended claims.

The object of the invention is to provide an improved arrangement for actuating the valve piece that is so constructed as to lock the valve piece against the seat, and also to lock it open, while permitting the valve piece to be quickly moved away from and toward its seat to open and close the valve.

In the drawings, Figure 1 is a vertical section of a globe valve embodying my invention. Fig. 2 is a plan view of the upper end thereof. Fig. 3 is a cross section taken through the screw-threaded valve stem and bushing. Fig. 4 is a similar view taken through the bushing. Fig. 5 is a like view taken through the stem.

As shown in the drawings, 10 designates the body of the valve casing provided with inlet and outlet branches 11 and 12 and with a diaphragm 13 in which is formed the passage which connects one side of the valve with the other. 14 designates the bonnet of the valve casing attached to the body by screw-bolts or studs 15 and provided with a neck 16 upwardly through which the stem 17 of the valve piece extends. The stem extends through the usual stuffing box gland 18 at the outer end of the neck and is provided outside of said stuffing box with a hand lever 19 by which the stem is rotated to move the valve piece toward and from its seat. The said diaphragm 13 is formed with a screw-threaded opening to receive a screw-threaded ring 20, at the upper end of which is formed an annular, tapered seat which is engaged by the tapered or conical seating face of the swivel valve piece 21 that is loosely connected to the lower end of the stem 17.

So far as is concerned the above described features of construction, the valve may be otherwise made, the invention being adaptable to other types of valves, such as gate angled or balanced valves and the like.

Referring now to the features of construction constituting my invention, the same are made as follows: The valve stem 17 is provided with an exterior screw-thread 27 which engages with an interior screw-thread 28 of a bushing or sleeve 29 that is fixed in any suitable manner in the lower end of the neck 16. As shown the said bushing is screw-threaded in the neck and is provided at its lower end with a radial flange 30 which engages a downwardly facing shoulder 31 in the bonnet, and the bushing is fixed from rotation by means of a screw stud 32 extending through the flange and into said shoulder. The screw-thread of the valve stem 17 is interrupted or cut away throughout its depth on opposite sides of said stem so as to provide on the stem oppositely disposed recesses 35 extending throughout the length of the screw-threaded portion of the stem and leaving on the sides of the stem adjacent to said recesses, and opposite to each other, segments of the screw-thread 27. The interior screw-thread 28 of the bushing is likewise cut away throughout its depth on opposite sides of said bushing to provide oppositely arranged elongated recesses 37 and intervening segments of the screw-thread 28. The angular width of said spaces in the screw-threaded portions of the stem and bushing is slightly greater than the angular width of the segments of the screw-threads left on the stem and bushing after the stem and bushing have been cut to produce the recesses. When, therefore, the stem is turned on its axis to bring the segments of the screw-thread thereof in line with the spaces or interruptions between the segments of the screw-thread of the bushing, the said stem is free to be shifted endwise in the direction of its axis, whereby the valve piece may be quickly moved away from or toward its seat; the segments of the valve stem screw-thread passing at this time through the recesses 37 of the bushing. The means herein shown for thus shifting the valve stem endwise, when the segments of the two sets of screw-threads are released from each other, are made as follows: 38 designates a vertically swinging lever that is provided with a yoke 39 that encircles the upper end of the stem 17 above the neck 16. The lever is provided at one end thereof with a hand piece 40 and is pivoted at its other end, as by means of a pin 41, to the upper end of a vertically swinging link or bar 42. Said link is pivoted at its lower end, as by means of a pin 43, to a lug 44 integral with the valve casing bonnet. Surrounding the upper end of said valve stem, and located within the yoke 39, is a collar 46 within which the stem is capable of rotating, said collar being confined from movement endwise on the stem between a locking ring 47 and the lower end of the hub 48 of the stem rotating lever 19. The raising and lowering lever 38 is pivotally connected to said collar 46 by means of short, horizontal studs 50 which extend horizontally inwardly from opposite sides of the yoke and engage sockets in the opposite sides of said collar 46, as most clearly shown in Fig. 2. The rotative movement of the stem 17 and its actuating lever 19 is limited by means of a pin or stud 52 which is fixed in and extends radially from one side of the hub of said lever 19, in the manner shown in Fig. 2, and is adapted to engage a fixed stop or lug 53 made integral with the collar 46. The extent of rotative movement of the valve stem to free the mutilated thread of the stem from that of the bushing is substantially ninety degrees, as herein shown.

The operation of the valve actuating device thus constructed is as follows: The valve piece is locked against its seat through the operation of the interacting screw-threads of the stem and bushing at a time when the segments of the screw-threads are in the position shown in Fig. 3; and the pitch of the screw-threads is such that the turning of the screw-thread segments upon each other throughout the angular width of said segments is sufficient, after the valve piece is lowered against its seat, to press the valve piece against its seat with such force as to form the desired valve joint. When it is desired to raise the valve off its seat, the stem is turned until the segments of the screw-thread 27 thereon are brought opposite the spaces or interruptions 37 of the screw-thread of the bushing, whereupon the valve raising lever 38 is swung upwardly about its pivot to raise the valve to its full open position, or less than its full open position, as desired. The valve is locked in its open position by turning the screw-thread of the stem into interlocking engagement with the screw-thread of the bushing. The valve is closed quickly upon its seat and is locked in its closed position by a movement the reverse of that above described for opening the valve. The pivoted connection of the lever 38 with the valve casing, through the medium of the swinging link or bar 42, permits said lever to give the stem a straight lift and avoids a binding action of the stem against the parts in which it is guided.

It will be understood that the details are capable of variation within the spirit and scope of the invention, and the invention is not limited to the illustrated details except as hereinafter made the subject of specific claims.

I claim as my invention:

1. A quick opening valve comprising, in combination, a casing provided with a seat, a valve piece movable toward and from said seat, and a stem by which the valve piece is carried, the stem and casing being provided with screw threads for locking the valve piece against its seat, and the interacting screw threads being mutilated to permit the screw threads to be released from each other upon rotation of the stem and to permit the stem to be moved non-rotatively in the casing in the direction of the axis of the stem.

2. In a valve, the combination with a casing provided with a seat and a valve piece movable toward and from said seat, of a screw-threaded stem carrying said valve piece engaging a screw-thread in the casing, said screw-threads being interrupted to permit the stem to slip past the screw-threads of the casing, means on the outer end of the stem for rotating the same and a swinging lever pivotally connected with the outer end of the stem for moving the latter endwise.

3. A quick opening valve comprising, in combination, a casing provided with a seat, a valve piece movable toward and from said seat, a stem by which the valve piece is carried, screw-threads on the stem and the casing constructed to lock the valve against its seat and mutilated to permit the stem and valve piece to be non-rotatively moved in the direction of the axis of the stem toward and from said seat, means at the outer end of said stem for turning the stem, and a lever pivotally connected with the stem for reciprocating it toward and from the valve seat.

4. A quick opening valve comprising, in combination, a casing provided with a seat, a valve piece movable toward and from said seat, a stem by which the valve piece is carried, screw-threaded means on the stem and the casing constructed to lock the valve against its seat and to permit the stem and valve piece to be non-rotatively moved in the direction of the axis of the stem toward and from said seat, means at the outer end of said stem for turning the stem, a collar surrounding said stem in which the stem is rotative, said collar being confined from endwise movement on the stem and a lever swingable in the plane of the stem pivotally connected to said collar.

5. A quick opening valve comprising, in combination, a casing provided with a seat, a valve piece movable toward and from said seat, and a stem by which the valve piece is carried, the stem and casing being provided with screw-threads for locking the valve piece against its seat, the interacting screw-threads being cut away longitudinally of the stem to permit the screw-threads to be released from each other upon rotation of the stem, means at the outer end of the stem for rotating the stem and means for reciprocating the stem toward and from the seat when the interacting threads are released from each other.

6. A quick opening valve comprising, in combination, a casing provided with a seat, a valve piece movable toward and from said seat, and a stem by which the valve piece is carried, the stem and casing being provided with screw-threads for locking the valve piece against its seat, the interacting screw-threads being cut away longitudinally of the stem to permit the screw-threads to be released from each other upon rotation of the stem, means at the outer end of the stem for rotating the stem, means for limiting the rotation of the stem to effect registration of the screw-thread on the stem with the cut-away portions of the casing screw thread, and vice-versa, and means for reciprocating the stem toward and from the seat when the interacting threads are released from each other.

In testimony, that I claim the foregoing as my invention I affix my signature in the presence of two witnesses, this 2nd day of November A. D. 1909.

WILLIAM L. OSBORNE.

Witnesses:
WILLIAM GOLDBERGER,
G. R. WILKINS.